(12) United States Patent
Toda et al.

(10) Patent No.: US 10,602,087 B2
(45) Date of Patent: *Mar. 24, 2020

(54) IMAGE ACQUISITION DEVICE, AND IMAGING DEVICE

(71) Applicant: HAMAMATSU PHOTONICS K.K., Hamamatsu-shi, Shizuoka (JP)

(72) Inventors: Eiji Toda, Hamamatsu (JP); Takuo Kameyama, Hamamatsu (JP)

(73) Assignee: HAMAMATSU PHOTONICS K.K, Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,084

(22) Filed: Jun. 7, 2019

(65) Prior Publication Data

US 2019/0297281 A1  Sep. 26, 2019

Related U.S. Application Data

(63) Continuation of application No. 16/149,642, filed on Oct. 2, 2018, now Pat. No. 10,362,245, which is a (Continued)

(30) Foreign Application Priority Data

Feb. 1, 2013   (JP) .................................. 2013-018124

(51) Int. Cl.
*H04N 5/353* (2011.01)
*H04N 5/225* (2006.01)
(Continued)

(52) U.S. Cl.
CPC ......... *H04N 5/3532* (2013.01); *G02B 21/002* (2013.01); *G02B 21/008* (2013.01);
(Continued)

(58) Field of Classification Search
CPC ...... H04N 5/361; H04N 5/3575; H04N 5/378; H04N 5/3532; H04N 5/232; H04N 5/225;
(Continued)

(56) References Cited

U.S. PATENT DOCUMENTS 5,989,835 A   11/1999   Dunlay et al.
6,365,367 B1   4/2002   Friedman et al.
(Continued)

FOREIGN PATENT DOCUMENTS

CA   2 282 658 A1   9/1998
CA   2 328 194 A1   1/2000
(Continued)

OTHER PUBLICATIONS

Eugen Baumgart et al., "Scanned light sheet microscopy with confocal slit detection", Optics Express, vol. 20, No. 19, Sep. 3, 2012, p. 21805-p. 21814.
(Continued)

*Primary Examiner* — Antoinette T Spinks
(74) *Attorney, Agent, or Firm* — Faegre Drinker Biddle & Reath LLP

(57) ABSTRACT

An image acquisition system 1 includes: a light source 3 which outputs illumination light; an optical scanner 7 which scans a sample S with the illumination light; an optical scanner control unit 9; a detection optical system 15, 17 which focuses fluorescence from the sample S; an imaging device 19 which has a light receiving surface 19*c* in which a plurality of pixel rows 19*d* are arranged, and an imaging control section 19*b*, and which can perform signal readout of each of the plurality of pixel rows 19*d* from the light receiving surface 19*c*; and a calculation unit 21 which calculates an interval of signal readout between adjacent pixel rows 19*d*, based on a moving speed of an illuminated region on the light receiving surface 19*c*; the imaging (Continued)

control section 19*b* controls signal readout of each pixel row 19*d*, based on the interval of the signal readout thus calculated.

11 Claims, 12 Drawing Sheets

Related U.S. Application Data continuation of application No. 15/145,031, filed on May 3, 2016, now Pat. No. 10,142,566, which is a continuation of application No. 14/413,602, filed as application No. PCT/JP2014/051260 on Jan. 22, 2014, now Pat. No. 9,423,601.

(51) Int. Cl.
| | | |
|---|---|---|
| *H04N 5/232* | (2006.01) | |
| *H04N 3/14* | (2006.01) | |
| *H04N 5/378* | (2011.01) | |
| *H04N 5/359* | (2011.01) | |
| *G02B 21/00* | (2006.01) | |
| *G02B 21/36* | (2006.01) | |
| *H04N 5/235* | (2006.01) | |
| *H04N 5/341* | (2011.01) | |
| *G02B 21/16* | (2006.01) | |

(52) U.S. Cl.
CPC ......... *G02B 21/0036* (2013.01); *G02B 21/16* (2013.01); *G02B 21/365* (2013.01); *G02B 21/367* (2013.01); *H04N 3/1512* (2013.01); *H04N 5/225* (2013.01); *H04N 5/2256* (2013.01); *H04N 5/232* (2013.01); *H04N 5/2354* (2013.01); *H04N 5/341* (2013.01); *H04N 5/359* (2013.01); *H04N 5/378* (2013.01)

(58) Field of Classification Search
CPC .... H04N 5/2256; H04N 5/2354; H04N 5/341; H04N 5/359; G02B 21/002; G02B 21/0036; G02B 21/008; G02B 21/16; G02B 21/365; G02B 21/367
USPC .................................................. 348/370, 241
See application file for complete search history.

(56) References Cited

U.S. PATENT DOCUMENTS

| | | |
|---|---|---|
| 6,416,959 B1 | 7/2002 | Giuliano et al. |
| 6,573,039 B1 | 6/2003 | Dunlay et al. |
| 6,620,591 B1 | 9/2003 | Dunlay et al. |
| 6,671,624 B1 | 12/2003 | Dunlay et al. |
| 6,716,588 B2 | 4/2004 | Sammak et al. |
| 6,727,071 B1 | 4/2004 | Dunlay et al. |
| 6,759,206 B1 | 7/2004 | Rubin et al. |
| 6,875,578 B2 | 4/2005 | Giuliano et al. |
| 6,902,883 B2 | 6/2005 | Dunlay et al. |
| 6,917,884 B2 | 7/2005 | Sammak et al. |
| 6,970,789 B2 | 11/2005 | Ippolito et al. |
| 6,986,993 B1 | 1/2006 | Ghosh et al. |
| 7,060,445 B1 | 6/2006 | Dunlay et al. |
| 7,085,765 B2 | 8/2006 | Zock et al. |
| 7,117,098 B1 | 10/2006 | Dunlay et al. |
| 7,160,687 B1 | 1/2007 | Kapur et al. |
| 7,235,373 B2 | 6/2007 | Dunlay et al. |
| 7,476,510 B2 | 1/2009 | Kapur et al. |
| 8,237,835 B1 | 8/2012 | Muller |
| 2004/0086204 A1 | 5/2004 | Shoji |
| 2006/0017001 A1 | 1/2006 | Donders et al. |
| 2008/0002036 A1 | 1/2008 | Ohwa |
| 2008/0049132 A1 | 2/2008 | Suzuki |
| 2008/0170137 A1 | 7/2008 | Matsumoto et al. |
| 2008/0204766 A1 | 8/2008 | Uhl |
| 2009/0190943 A1 | 7/2009 | Yamashita |
| 2010/0007849 A1 | 1/2010 | Liesfeld et al. |
| 2013/0021474 A1 | 1/2013 | Taylor et al. |
| 2013/0063653 A1 | 3/2013 | Kita |
| 2013/0113907 A1* | 5/2013 | Ono .................. A61B 1/05 348/68 |

FOREIGN PATENT DOCUMENTS

| | | |
|---|---|---|
| CA | 2 362 117 A1 | 8/2000 |
| CA | 2 381 344 A1 | 2/2001 |
| CN | 1407387 A | 4/2003 |
| CN | 101276539 A | 10/2008 |
| CN | 101796823 A | 8/2010 |
| CN | 102455500 A | 5/2012 |
| CN | 102695004 A | 9/2012 |
| CN | 102761712 A | 10/2012 |
| CN | 102859418 A | 1/2013 |
| CN | 102883114 A | 1/2013 |
| EP | 0 983 498 A1 | 3/2000 |
| EP | 1 095 277 A2 | 5/2001 |
| EP | 1 155 304 A2 | 11/2001 |
| EP | 1 203 214 A1 | 5/2002 |
| EP | 1 348 124 A2 | 10/2003 |
| EP | 1 368 689 A1 | 12/2003 |
| EP | 2 990 850 A1 | 3/2016 |
| JP | 2002-039716 A | 2/2002 |
| JP | 3466568 B2 | 11/2003 |
| JP | 3576491 B2 | 10/2004 |
| JP | 3683591 B2 | 8/2005 |
| JP | 2007-135073 A | 5/2007 |
| JP | 4011936 B2 | 11/2007 |
| JP | 2008-016977 A | 1/2008 |
| JP | 2008-507719 A | 3/2008 |
| JP | 2010-141799 A | 6/2010 |
| JP | 2011-101273 A | 5/2011 |
| JP | 2011-118070 A | 6/2011 |
| JP | 2011-244253 A | 12/2011 |
| JP | 2012-118363 A | 6/2012 |
| JP | 4949709 B2 | 6/2012 |
| JP | 2012-204872 A | 10/2012 |
| JP | 2013-098792 A | 5/2013 |
| KR | 100782768 B1 | 12/2007 |
| WO | WO-98/038490 A1 | 9/1998 |
| WO | WO-2007/142960 A2 | 12/2007 |
| WO | WO-2008/003788 A2 | 1/2008 |
| WO | WO-2011/120629 A1 | 10/2011 |
| WO | WO-2011/145342 A1 | 11/2011 |
| WO | WO-2012/002893 A1 | 1/2012 |
| WO | WO-2014/175219 A1 | 10/2014 |

OTHER PUBLICATIONS

English-language translation of International Preliminary Report on Patentability (IPRP) dated Aug. 13, 2015 that issued in WO Patent Application No. PCT/JP2014/051260.
Mei, E., et al., "A line scanning confocal fluorescent microscope using a CMOS rolling shutter as an adjustable aperture," Journal of Microscopy, vol. 247, Pt. 3, accepted Jun. 14, 2012, Feb. 29, 2012, pp. 269-276.
Andortm Technology, "Neo sCMOS," Hardware Guide, Oct. 2011.
"Fairchild Imaging Preliminary CIS1042 Programming Reference Manual," Fairchild Imaging.
Micron Technology, Inc., "1/2 3-Megapixel CMOS Digital Image Sensor," MT9T001P12STC, Micron, 2004, pp. 1-41.
U.S. Office Action dated Mar. 16, 2018 from U.S. Appl. No. 15/145,031 including double patenting rejections at pp. 2-5.

* cited by examiner

IMAGE ACQUISITION DEVICE, AND IMAGING DEVICE

CROSS-REFERENCE TO RELATED APPLICATIONS

This application is a continuation of copending U.S. patent application Ser. No. 16/149,642, filed Oct. 2, 2018, which is a continuation of U.S. patent application Ser. No. 15/145,031, filed May 3, 2016, now U.S. Pat. No. 10,142,566, which is a continuation of U.S. patent application Ser. No. 14/413,602, filed Jan. 8, 2015, now U.S. Pat. No. 9,423,601, which is a national stage filing of International Application No. PCT/JP2014/051260, filed Jan. 22, 2014, which claims the benefit of Japanese Patent Application No. 2013-018124, filed Feb. 1, 2013, the entire contents of each of which are incorporated herein by reference.

TECHNICAL FIELD

The present invention relates to an image acquisition system and an imaging apparatus for acquiring an image of an observation object.

BACKGROUND ART

Recently, CMOS (Complementary Metal Oxide Semiconductor) cameras have been used in observing light from an object. The CMOS cameras are generally more advantageous in terms of high readout speed, capability of easy partial readout, and so on than CCD (Charge Coupled Device) cameras.

Non Patent Literature 1 below and Patent Literature 1 below disclose use of a CMOS sensor as an imaging element in a light sheet fluorescence microscope system (Light Sheet Microscopy system). In this microscope system, an observation object is imaged while scanning the observation object with an excitation beam, and this scanning with the excitation beam is synchronized with the rolling shutter operation of the CMOS sensor.

CITATION LIST

Patent Literature

Patent Literature 1: International Publication WO 2011/120629

Non Patent Literature

Non Patent Literature 1: Eugen Baumgart and Ulrich Kubitscheck, "Scanned light sheet microscopy with confocal slit detection," OPTICS EXPRESS, Vol. 20, No. 19, pp. 21805-21814, Sep. 3, 2012

SUMMARY OF INVENTION

Technical Problem

In the foregoing conventional microscope system, however, it is difficult to give the scan speed of the excitation light a degree of freedom, because the scan with the excitation beam is to be synchronized with the rolling shutter operation of the CMOS sensor. As a result, the conventional microscope system tended not to allow flexible observation under a diversity of conditions for various observation objects.

Therefore, the present invention has been accomplished in view of this problem and it is an object of the present invention to provide an image acquisition system and an imaging apparatus enabling flexible observation with a higher degree of freedom given to the scan speed of illumination light across the observation object.

Solution to Problem

In order to solve the above problem, an image acquisition system according to one aspect of the present invention is an image acquisition system for scanning an object with illumination light to acquire an image of the object, including a light source for outputting the illumination light, a light scanning unit for receiving the illumination light from the light source, and for scanning the object with the illumination light, a light scan control unit for controlling the light scanning unit, an optical system for guiding light from the object, an imaging device comprising a light receiving section in which a plurality of pixel rows configured to capture the light guided by the optical system are arranged, and an imaging control section configured to control signal readout of the light receiving section, and for performing signal readout by rolling readout of each of the plurality of pixel rows from the light receiving section, and a calculation unit for calculating an interval of signal readout between adjacent pixel rows, based on a moving speed of an illuminated region on the light receiving section with scanning by the light scanning unit, wherein the imaging control section controls signal readout of each pixel row, based on the interval of the signal readout thus calculated.

In the image acquisition system as described above, with the illumination light output from the light source, the object is scanned by the light scanning unit, and the light generated from the object in response thereto is guided through the optical system to be imaged by the imaging device which can perform the signal readout by the rolling shutter. On that occasion, the interval of the signal readout between adjacent pixel rows in the light receiving section is calculated based on the moving speed of the illuminated region on the light receiving section of the imaging device with the scanning with the illumination light, and the signal readout of each pixel row is controlled based on the calculation result. This gives the scan speed of the illumination light across the object a degree of freedom, thereby to realize flexible observation of the object, and also reduces influence of background noise such as scattered light in the entire image in a light scan range of the object, thereby enabling improvement in spatial resolution.

As another solution, an imaging apparatus according to another aspect of the present invention is an imaging apparatus which performs signal readout by rolling readout of each of a plurality of pixel rows, including a light receiving section in which the plurality of pixel rows are arranged, and an imaging control section for controlling signal readout of the light receiving section, wherein the imaging control section is configured to control the signal readout, based on a driving clock, and to variably set an interval of signal readout between adjacent pixel rows.

In the imaging apparatus as described above, the interval of the signal readout between adjacent pixel rows in the light receiving section is changed based on the driving clock. This gives a degree of freedom to difference of signal readout of each pixel row in an image signal of the observation object, thereby enabling realization of flexible observation of the object.

Advantageous Effect of Invention

The present invention has enabled flexible observation with a higher degree of freedom given to the scan speed of the illumination light across the observation object.

DESCRIPTION OF EMBODIMENTS

Figure 1:
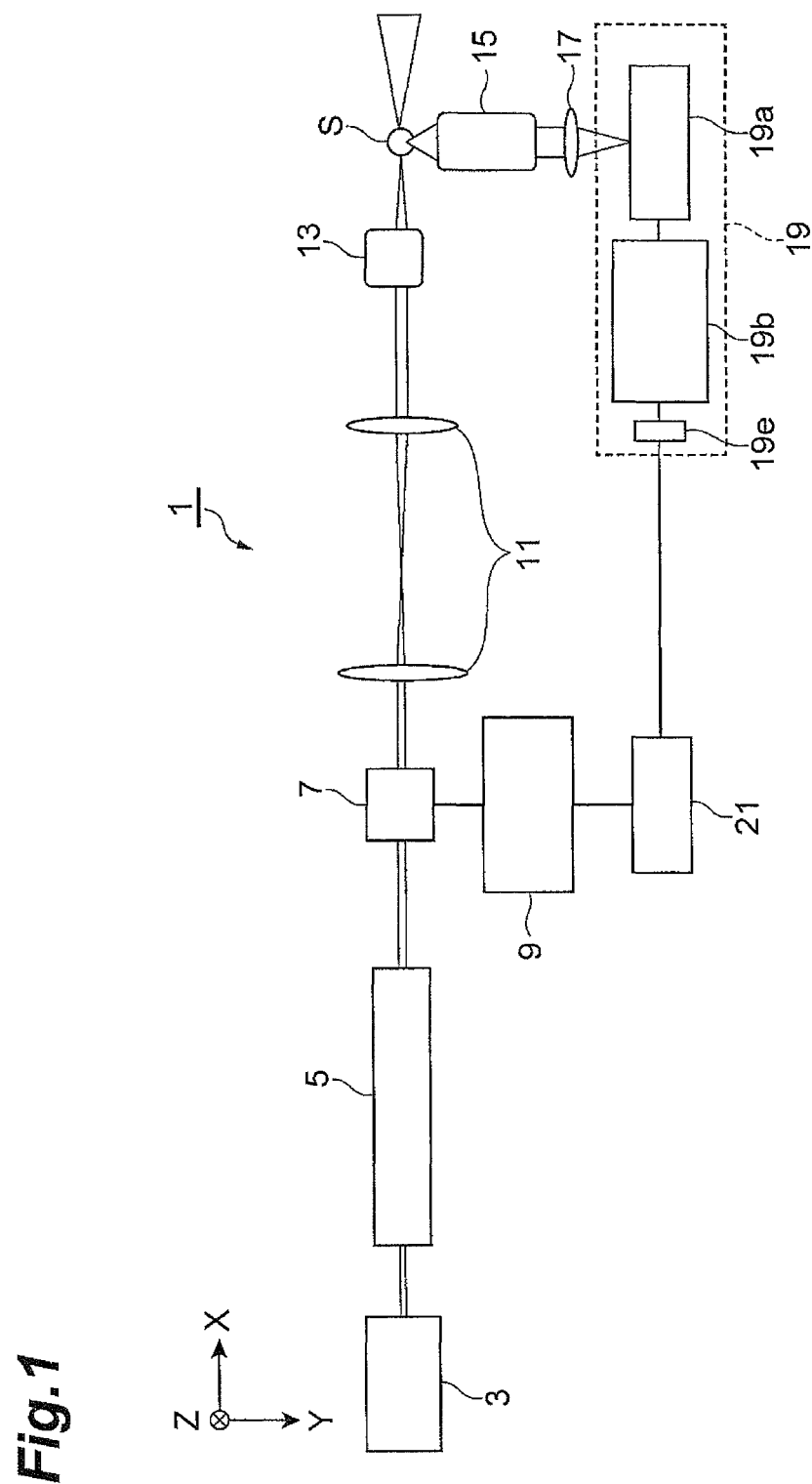
FIG. 1 is a plan view showing a schematic configuration of an image acquisition system 1 according to a preferred embodiment of the present invention.

Embodiments of the image acquisition system and the imaging apparatus according to the present invention will be described below in detail with reference to the accompanying drawings. In the description of the drawings the same elements will be denoted by the same reference signs, without redundant description. It is noted that each of the drawings was prepared for an illustrative purpose and portions subject to description are depicted with particular emphasis. For this reason, dimensional ratios of respective members in the drawings are not always coincident with actual ones.

Figure 2:
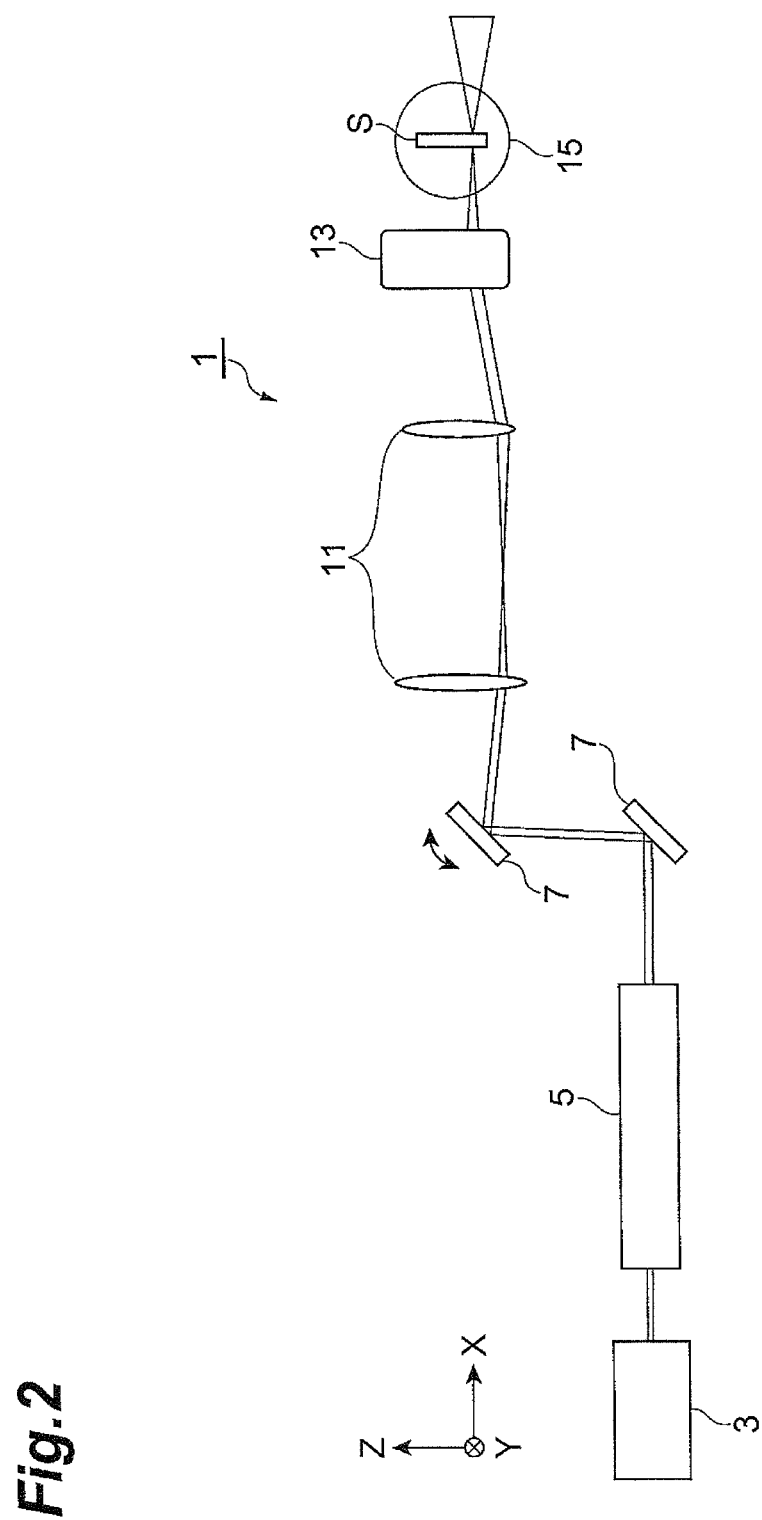
FIG. 2 is a side view showing a schematic configuration of the image acquisition system 1 in FIG. 1.

FIG. 1 is a plane view schematically showing a configuration of the image acquisition system 1 according to one embodiment of the present invention, and FIG. 2 a side view of the image acquisition system 1 shown in FIG. 1. The image acquisition system 1 of the present embodiment is a device for applying illumination light onto a sample (object) S and acquiring a resultant fluorescence image (picture). In the description hereinbelow, an X-axis direction is defined as a direction along an optical axis of an illumination optical system of the illumination light applied to the sample S, a Y-axis direction as a direction along an optical axis of a detection optical system for fluorescence from the sample S perpendicular to the X-axis direction, and a Z-axis direction as a direction perpendicular to the X-axis direction and the Y-axis direction. It is noted that the image acquisition system 1 does not have to be limited to the configuration for acquiring the fluorescence image of the sample S but may have a configuration for acquiring a reflection image, a transmission image, or a scatter image of the sample S or may be one of various image acquisition systems such as microscope systems and flow cytometers of various configurations such as bright field microscope equipment, dark field microscope equipment, and reflection microscope equipment.

The image acquisition system 1 is configured including: a light source 3 which outputs the illumination light of a predetermined wavelength to excite a fluorescent substance in the sample S; an optical scanner (light scanning unit) 7 which receives the illumination light from the light source 3 through a light guide means 5; an optical scanner control unit (light scan control unit) 9 which controls the optical scanner 7; a relay optical system (illumination optical system) 11 which guides the illumination light from the optical scanner 7; an objective lens (illumination optical system) 13 which converges the illumination light guided by the relay optical system 11, toward the sample S; an objective lens (detection optical system) 15 which converges fluorescence from the sample S; a relay optical system (detection optical system) 17 which guides the fluorescence from the objective lens 15; an imaging device 19 which captures a fluorescence image from the sample S guided by the relay optical system 17; and a calculation unit 21 electrically coupled to the imaging device 19 and to the optical scanner control unit 9. The fluorescence image captured by the imaging device 19 is output by an output means (not shown) such as a display device coupled to the image acquisition system 1.

The light guide means 5 may be composed of an optical fiber such as a single-mode fiber or may be composed of another type of optical fiber or a lens. The optical scanner 7 scans with the illumination light from the light guide means 5 at least in one direction (e.g., in one direction along the XZ plane in FIG. 2). For example, the optical scanner 7 is a galvanometer scanner including a galvanometer mirror. The optical scanner 7 scans with the illumination light, thereby to enable an illuminated region with the illumination light converged in the sample S via the relay optical system 11 and the objective lens 13, to be moved at least in one direction (e.g., in the Z-axis direction in FIG. 2). It is noted herein that the illumination light, which is applied to the sample S from the light source 3 via the light guide means 5, optical scanner 7, relay optical system 11, and objective lens 13, may be light of a spot shape or light of a sheet shape spreading in one direction (e.g., in the Y-axis direction).

The imaging device 19 is a device that includes an imaging element 19a including a light receiving section in which a plurality of pixel rows are arranged, and an imaging control section 19b for controlling exposure and signal readout of the imaging element 19a and that can perform signal readout by rolling readout of each of the plurality of pixel rows from the light receiving section. For example, the imaging device 19 is a camera device including a CMOS image sensor and enables the exposure and signal readout by the so-called rolling shutter of the CMOS image sensor. The calculation unit 21 coupled to this imaging device 19 is composed of an information processing unit such as a personal computer and configured to receive a signal about a scan speed of the optical scanner 7 from the optical scanner control unit 9, to generate a signal for controlling the exposure and signal readout of each of the pixel rows in the imaging device 19, based on the received signal, and to send the generated signal to the imaging control section 19b of the imaging device 19 (the details of which will be described later).

Figure 3:
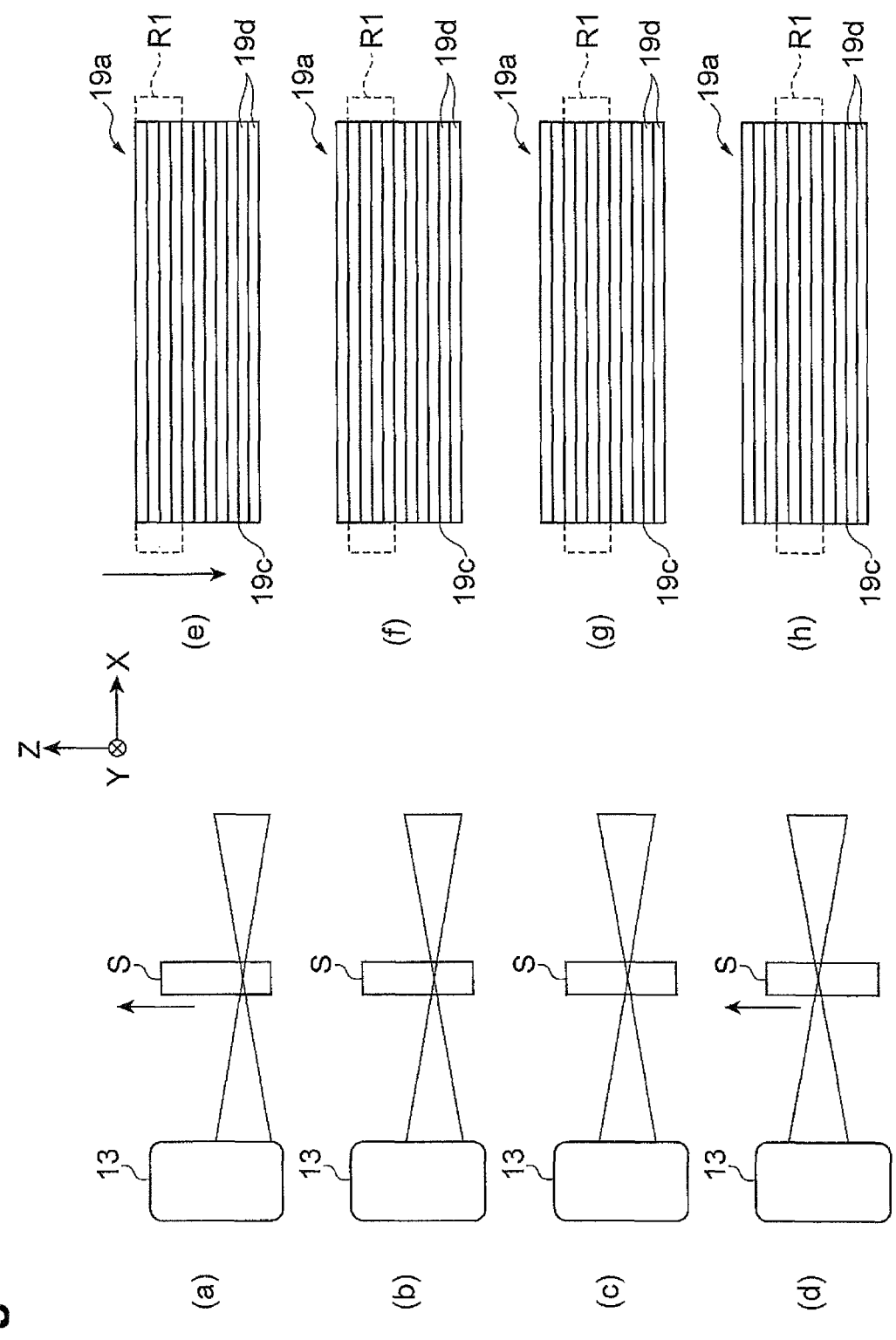
FIG. 3 is a drawing showing relations between scanning states of illumination light across a sample S and an illuminated region with a fluorescence image on an imaging element 19a in the image acquisition system 1 in FIG. 1.

The below will describe the relations between the scanning states of the illumination light across the sample S and the illuminated region with the fluorescence image in the imaging element 19a in the image acquisition system 1, with reference to FIG. 3. FIG. 3 (a) to (d) are side views showing the scanning states of the illumination light across the sample S in time series and FIG. 3 (e) to (h) show focused states of the fluorescence image on the imaging element 19a corresponding to the scanning states of FIG. 3 (a) to (d), respectively.

As shown in FIG. 3 (a) to (d), the illumination light applied into the sample S by scanning of the optical scanner 7 moves (or is scanned) along one direction (the Z-axis direction). The imaging element 19a herein, as shown in FIG. 3 (e) to (h), is configured so that its light receiving surface (light receiving section) 19c is arranged so as to be perpendicular to the optical axis (the Y-axis direction) of the detection optical system and so that the plurality of pixel rows 19d for taking the fluorescence image focused on the light receiving surface 19c are arranged along the Z-axis direction. By the arrangement and configuration of the imaging element 19a as described above, the illuminated region R1 with the fluorescence image of the sample S focused on the light receiving surface 19c moves (or is scanned) along the arrangement direction (the Z-axis direction) of the plurality of pixel rows 19d, in accordance with movement of a fluorescence-generated portion in the sample S with the scanning with the illumination light by the optical scanner 7. The range of the illuminated region R1 can be set to among a variety of ranges, and in the example of FIG. 3 the whole illumination optical system and detection optical system are set so that the illuminated region R1 is set in the range to cover four lines of pixel rows 19d.

Figure 4:
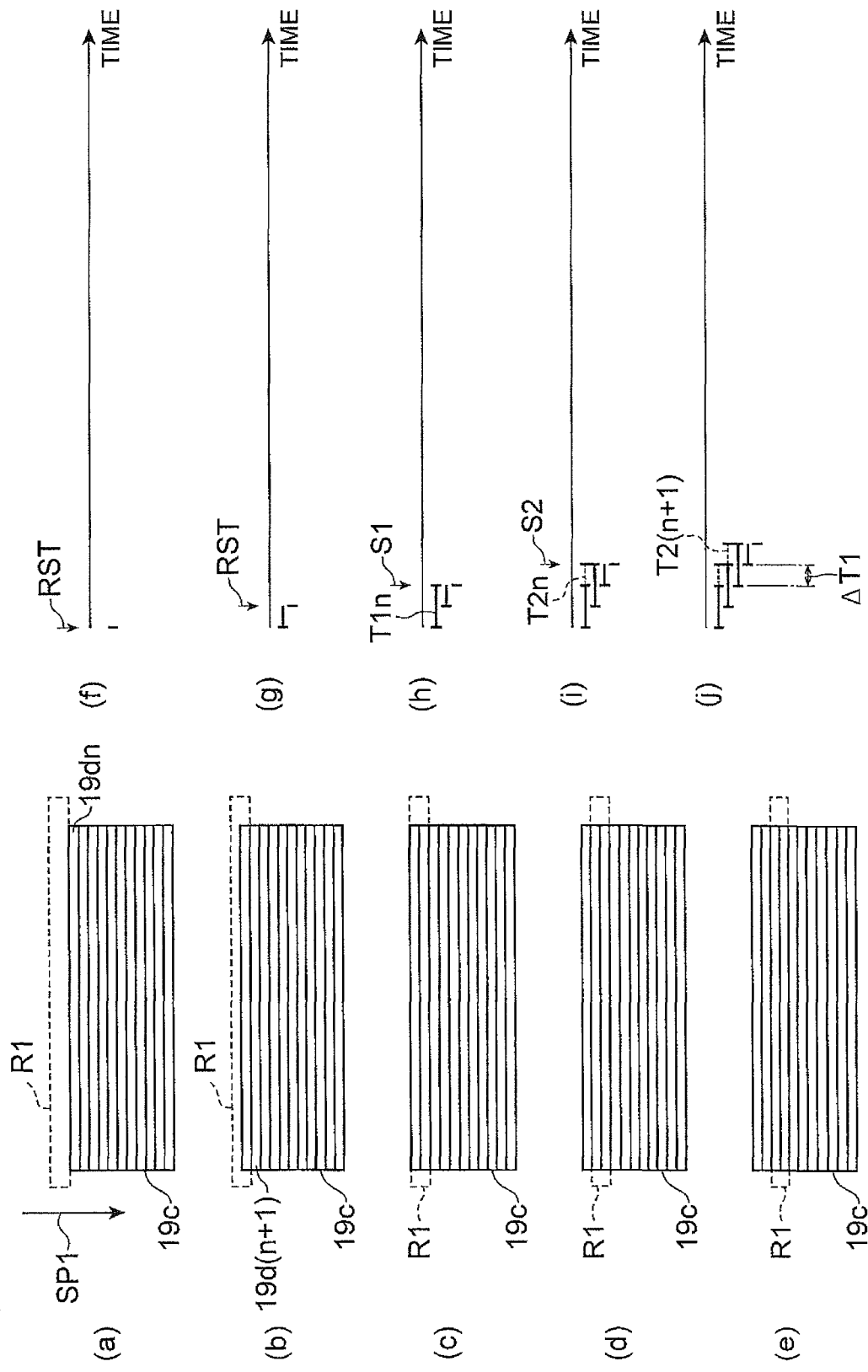
FIG. 4 is a drawing showing scanning states of an illuminated region R1 on a light receiving surface 19c of the imaging device 19 in FIG. 1 and timings of exposure and signal readout in each pixel row 19d of the light receiving surface 19c controlled corresponding to the scanning states.

The following will describe the operation of exposure and signal readout of the imaging device 19 according to the scanning of the illuminated region of the sample S, with reference to FIG. 4. FIG. 4 (a) to (e) are side views chronologically showing scanning states of the illuminated region R1 on the light receiving surface 19e of the imaging device 19 and FIG. 4 (f) to (j) timing charts showing timings of exposure and signal readout in each pixel row 19d of the light receiving surface 19c controlled corresponding to the scanning states of the FIG. 4 (a) to (e), respectively.

As shown in FIG. 4 (a) to (e), the optical scanner control unit 9 controls the scanning speed SP0 of the optical scanner 7 so that the moving speed on the light receiving surface 19c becomes a predetermined speed SP1. Such a relation between the scanning speed SP0 and the moving speed SP1 is determined by the configuration of the optical scanner 7, by a parameter defined by the configuration of the illumination optical system including the relay optical system 11 and objective lens 13, and a parameter defined by the detection optical system including the objective lens 15 and the relay optical system 17.

Corresponding to the scanning state of the illuminated region R1 as described above, the timings of exposure and signal readout in each pixel row 19d are controlled by the imaging control section 19b. Specifically, the imaging control section 19b performs such control as to set a signal readout period to read a charge signal, immediately after an exposure period which is a period for exposure with the fluorescence image and accumulation of the charge signal, for each of the pixel rows 19d, and as to repeat a period including the exposure period and the signal readout period in a predetermined cycle. Lengths of the exposure period and signal readout period, and start timings and end timings of them are set based on a driving clock generated inside.

More specifically, the imaging control section 19b generates a reset signal RST at a timing synchronized with the driving clock when a certain pixel row 19dn (n is an arbitrary natural number) enters the illuminated region R1 in accordance with the scanning of the optical scanner 7, to drain charge in the pixel row 19dn and initiate an exposure process (FIGS. 4 (a) and (f)). Thereafter, the imaging control section 19b counts the driving clock so as to generate the reset signal RST to start the exposure period for the pixel row 19d(n+1) adjacent in the scan direction after an interval of a predetermined period (FIGS. 4 (b) and (g)). In this manner, exposures of all the pixel rows 19d of the light receiving surface 19c are started in order with the interval of the predetermined period between pixel rows 19d adjacent in the scan direction.

Furthermore, the imaging control section 19b performs such control as to count the driving clock to generate a readout start signal S1 at a timing after continuation of the exposure period of the pixel row 19dn for a predetermined period T1n, thereby to start the readout of the charge signal of the pixel row 19dn (FIGS. 4 (c) and (h)). Namely, the charge signal accumulated in the pixel row 19dn is converted into a voltage to be read out. Furthermore, the imaging control section 19b performs such control as to count the driving clock to generate a readout end signal S2 at a timing after continuation of the signal readout period of the pixel row 19dn for a predetermined period T2n, thereby to end the readout of the charge signal of the pixel row 19dn (FIGS. 4 (d) and (i)).

Similarly, the imaging control section 19b sets the signal readout period T2(n+1) for the pixel row 19d(n+1) adjacent to the pixel row 19dn. In the signal readout by the rolling readout in the imaging device 19, the readout timings need to be made different among the respective pixel rows 19d and, for making the exposure periods for the respective pixel rows 19d equal, the exposure start timings need to be shifted row by row for the pixel rows. In the example of FIG. 4, the imaging control section 19b sets the generation timing of the readout start signal S1 with a difference of a predetermined interval ΔT1 between adjacent pixel rows 19d, whereby the start timing of the signal readout is shifted by the predetermined interval ΔT1 between adjacent pixel rows 19d.

It is noted herein that the difference (interval) ΔT1 of the start timing of signal readout set by the imaging control section 19b is variably set by a control signal sent from the calculation unit 21 to the imaging control section 19b. Specifically, the calculation unit 21 acquires information about the scan speed SP0 of the optical scanner 7 from the optical scanner control unit 9 and calculates the moving speed SP1 of the illuminated region R1 on the light receiving surface 19c, based on the scan speed SP0, a parameter defined by a magnification of the illumination optical system or the like, and a parameter defined by a magnification of the detection optical system or the like. Furthermore, the calculation unit 21 calculates the interval of the start timing of the exposure period so as to sequentially start the exposure of the pixel row 19d entering the illuminated region R1 in synchronism with the movement of the illuminated region R1 on the light receiving surface 19c, based on the calculated moving speed SP1, and, in conjunction therewith, it determines an interval ΔT1' of the start timing of signal readout between adjacent pixel rows 19d as an interval of the signal readout between adjacent pixel rows 19d. Then the calculation unit 21 sends the interval ΔT1' of the start timing of signal readout thus calculated, as an external signal to an external signal receiving section 19e of the imaging device 19. The interval ΔT1' of the start timing of signal readout thus received, is sent as data to the imaging control section 19b. This allows the imaging control section 19b to control the signal readout of each pixel row, e.g., the start timing of signal readout of each pixel row, based on the interval ΔT1' of the start timing of signal readout set by the calculation unit 21. The imaging device 19 may have the calculation unit 21. In that case, the external signal receiving section 19e of the imaging device 19 receives such data as the scanning speed SP0, the parameter defined by the magnification of the illumination optical system or the like, and the parameter defined by the magnification of the detection optical system or the like, as external signals. The external signals do not have to be limited to these as long as they are data or parameters for setting the interval ΔT1' of the start timing of signal readout.

Figure 5:
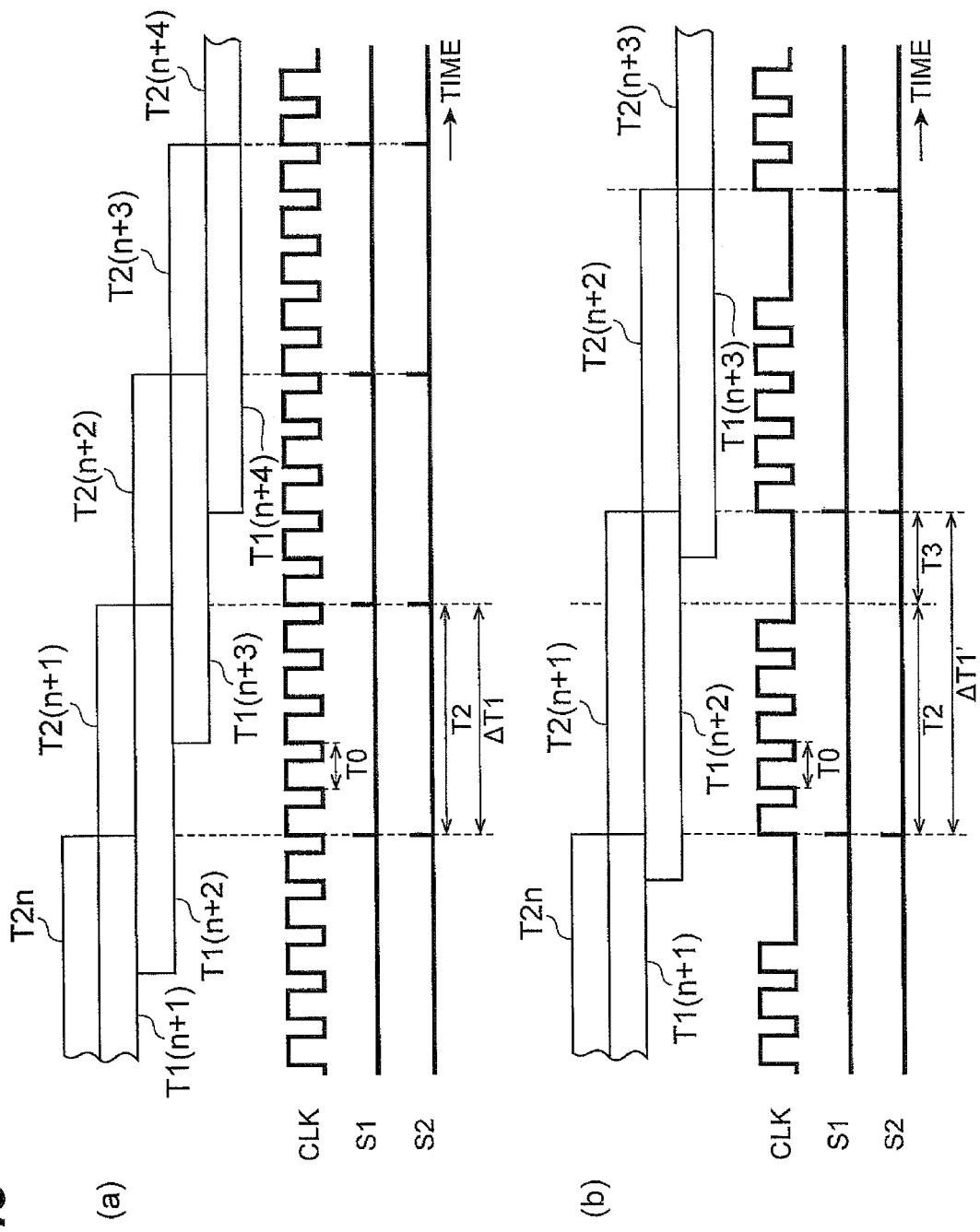
FIG. 5 is timing charts showing a relation between exposure periods and signal readout periods set for respective pixel rows 19d in the imaging device 19 in FIG. 1.

The following will describe the operation of adjusting the interval ΔT1 of the start timing of signal readout by the imaging control section 19b, in more detail with reference to FIG. 5. FIG. 5 is timing charts showing the relations between exposure periods and signal readout periods set for the respective pixel rows 19d in the imaging device 19.

FIG. 5 (a) is a timing chart showing the relation between exposure periods and signal readout periods in ordinary rolling readout. In the case of the ordinary rolling readout, the signal readout period T2 is set to a duration of time necessary for signal readout and the interval ΔT1 of the start timing of signal readout is set to be the signal readout period T2. Therefore, the imaging control section 19b counts the driving clock CLK repeated in a predetermined cycle T0, by a count equivalent to the interval ΔT1 of the start timing of signal readout from the readout start signal S1 for the preceding pixel row 19d, thereby to generate the readout start signal S1 for the subsequent pixel row adjacent thereto. In contrast to it, in FIG. 5 (b) a variable delay period T3 is provided after the signal readout period T2 equivalent to the duration of time necessary for the signal readout, in order to adjust the interval ΔT1 of the start timing of signal readout to the set interval ΔT1' of the start timing of signal readout. Specifically, in FIG. 5 (b), the imaging control section 19b calculates the delay time T3 from the interval ΔT1' of the start timing of signal readout and the signal readout period T2 and adjusts the driving clock so as to provide the delay period T3 at a timing after the driving clock CLK one pulse before arrival at the clock count equivalent to the signal readout period T2 in the driving clock CLK (or at a timing immediately before generation of the readout start signal S1). At this time, the imaging control section 19b generates no driving clock in the delay period T3 and therefore it counts the count of the driving clock CLK by the same count as the count of the driving clock CLK equivalent to ΔT1 in FIG. 5 (a), thereby to generate the readout start signal S1 for the next line of pixel row 19d. As a result, the interval of the start timing of signal readout between adjacent pixel rows 19d is set to the time ΔT1'=T2+T3. As operating in this manner, the imaging control section 19b can variably control the start timing of signal readout of each pixel row according to the interval ΔT1' of the start timing of signal readout calculated by the calculation unit 21. It is noted that the timing of provision of the delay period T3 does not have to be limited to the timing immediately before the generation of the readout start signal S1 but it may be provided in the signal readout period T2.

Figure 6:
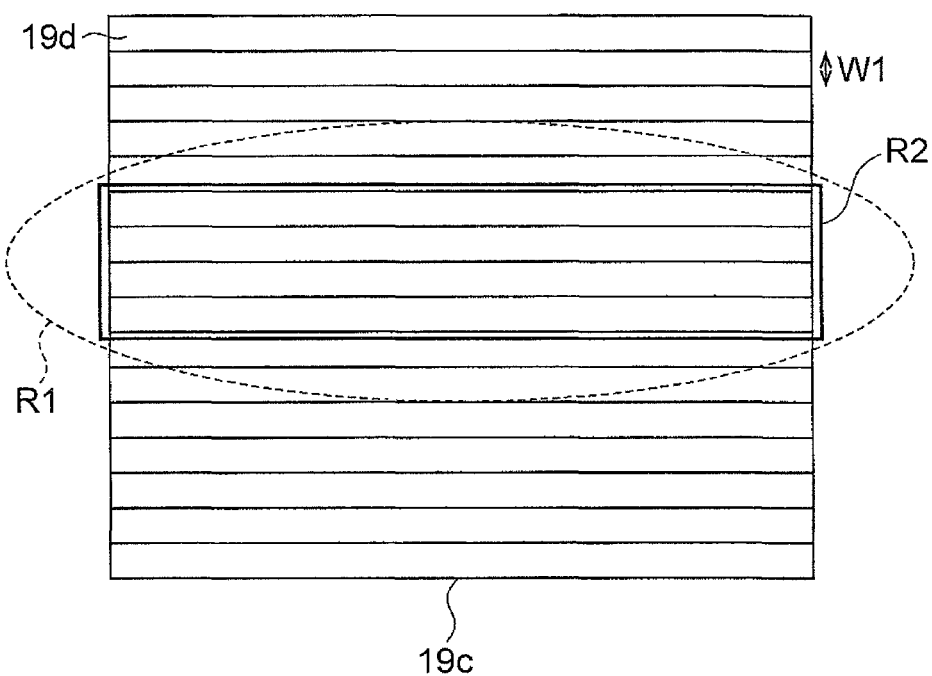
FIG. 6 is a drawing showing the illuminated region R1 on the light receiving surface 19c of the imaging device 19 in FIG. 1 and an exposure region R2 on the light receiving surface 19c set corresponding to it by an imaging control section 19b.

Furthermore, the imaging control section 19b is configured so as to be also able to variably set the number of pixel rows in the exposure region on the light receiving surface 19c to be simultaneously exposed, by adjusting the exposure periods for the respective pixel rows 19d. FIG. 6 shows the illuminated region R1 on the light receiving surface 19c of the imaging device 19 and the exposure region R2 on the light receiving surface 19c set corresponding to it by the imaging control section 19b. In general, it is difficult from an optical viewpoint to make the fluorescence incident from the sample S to the light receiving surface 19c, in a slit shape. Then, the range of the exposure region R2 including the simultaneously-exposed pixel rows 19d (the number of lines) is set by the imaging control section 19b, whereby it is feasible to image the fluorescence in a pseudo slit state of incidence thereof.

Figure 7:
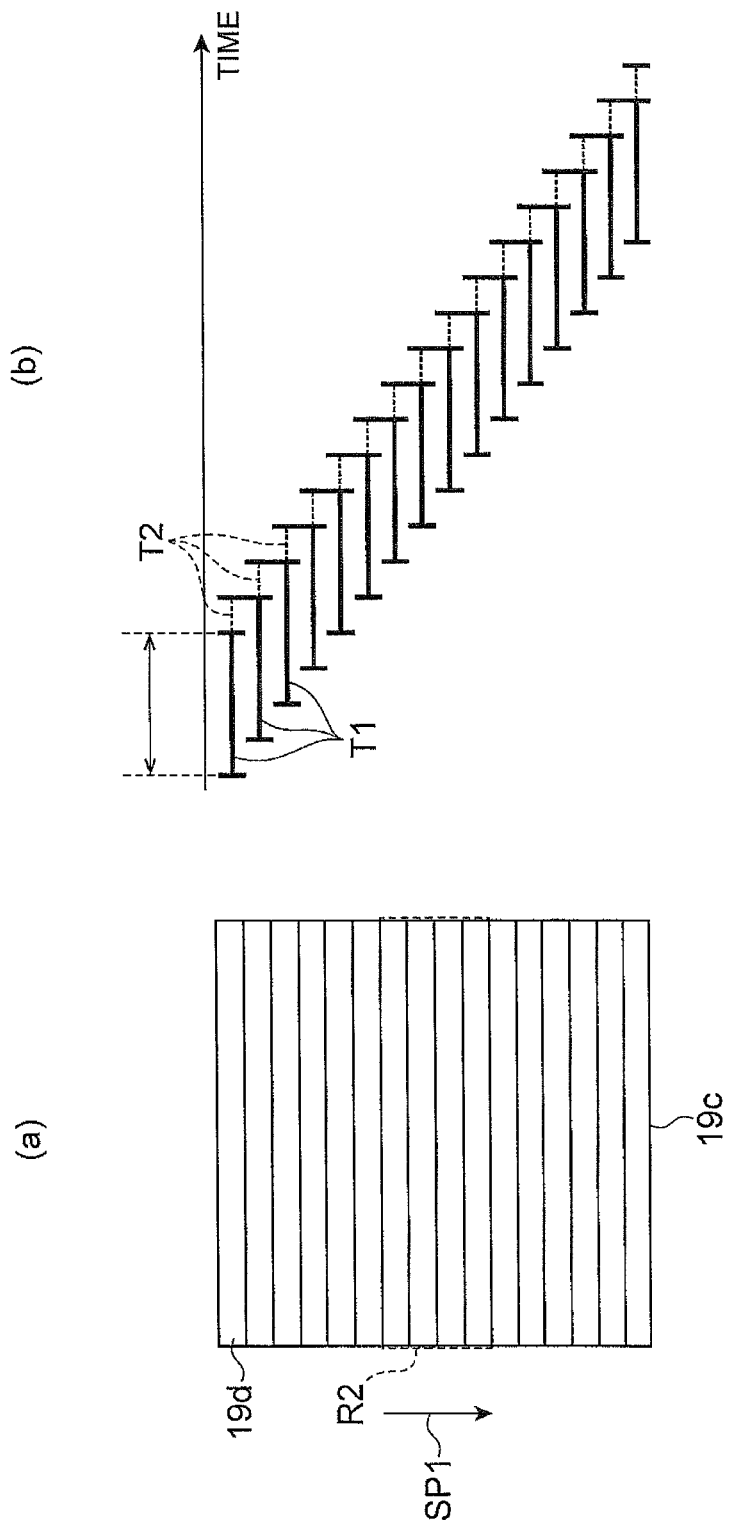
FIG. 7 is a timing chart showing the exposure periods set for the respective pixel rows 19d on the light receiving surface 19c when the number of rows in the exposure region R2 is controlled by the imaging control section 19b in FIG. 1.
Figure 8:
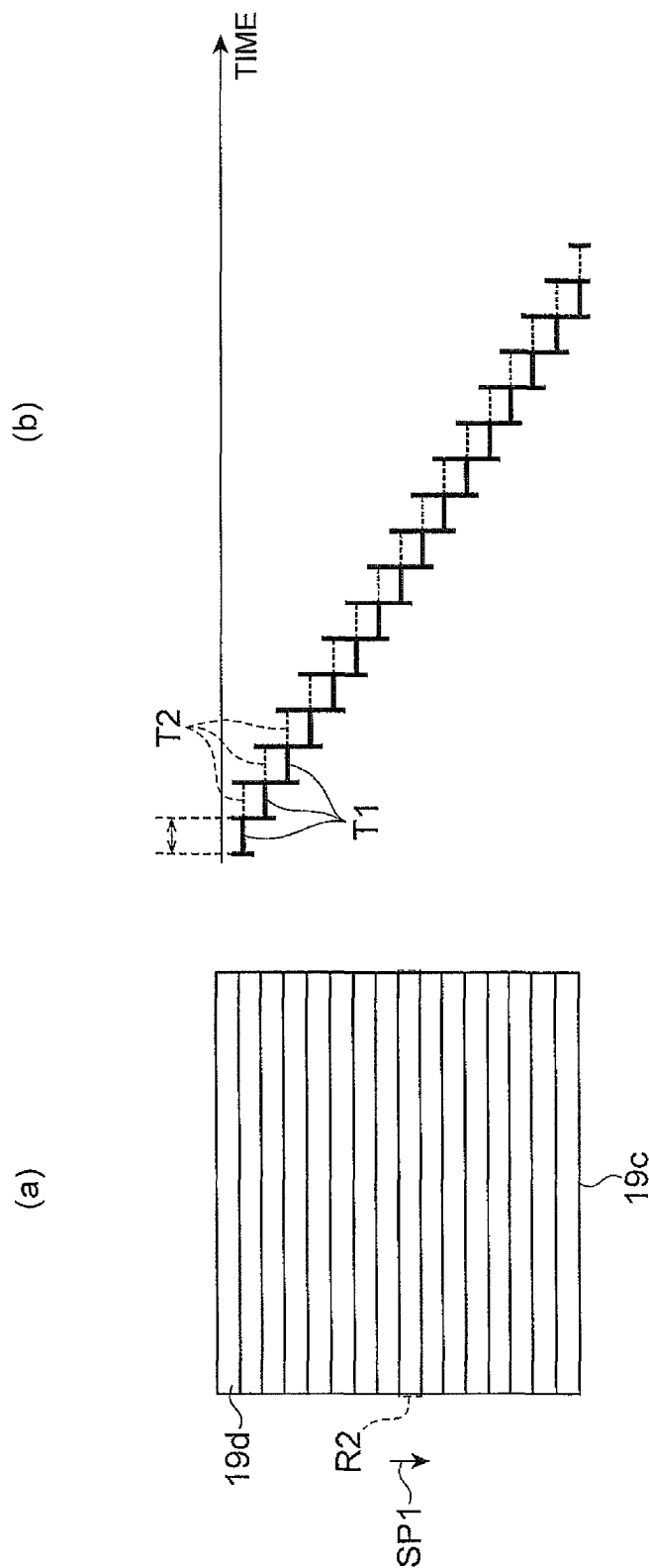
FIG. 8 is a timing chart showing the exposure periods set for the respective pixel rows 19d on the light receiving surface 19c when the number of rows in the exposure region R2 is controlled by the imaging control section 19b in FIG. 1.
Figure 9:
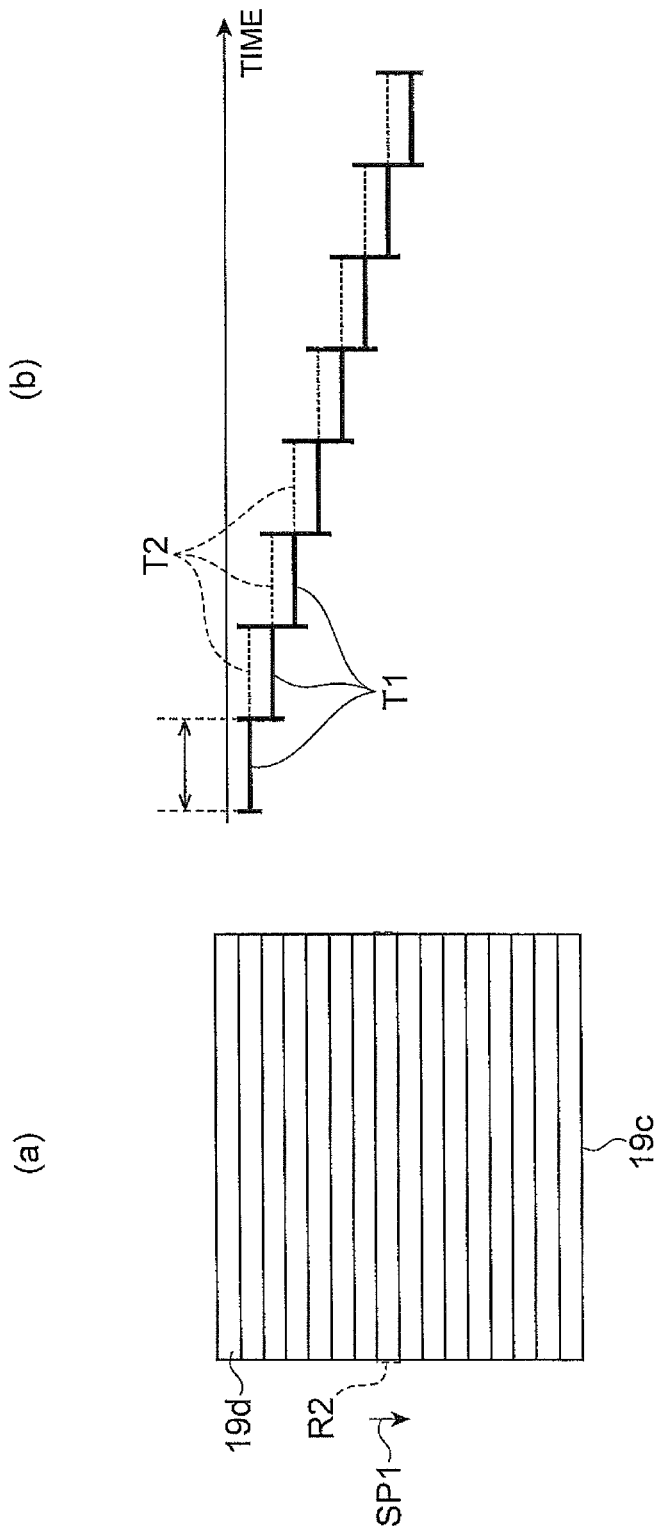
FIG. 9 is a timing chart showing the exposure periods set for the respective pixel rows 19d on the light receiving surface 19c when the number of rows in the exposure region R2 is controlled by the imaging control section 19b in FIG. 1.

Specifically, FIGS. 7 to 9 show the exposure periods set for the respective pixel rows 19d on the light receiving surface 19c when the number of rows in the exposure region R2 is controlled by the imaging control section 19b. In each of the drawings, (a) shows the exposure region R2 set on the light receiving surface 19c and (b) the exposure periods T1 and signal readout periods T2 of the respective pixel rows 19d set corresponding to the exposure region R2 shown in (a). The exposure periods T1 and signal readout periods T2 set in the respective rows are set so that the interval of the start timing of each period between adjacent pixel rows 19d is synchronized with the movement of the illuminated region R1 on the light receiving surface 19c, based on the calculation result of the calculation unit 21.

When the exposure region R2 is set over four lines as shown in FIG. 7, the imaging control section 19b sets the length of the exposure periods T1 so that the number of pixel rows 19d the exposure periods T1 of which overlap is four. Namely, the calculation unit 21 acquires the information about the scan speed SP0 of the optical scanner 7 from the optical scanner control unit 9 and calculates the length T1 of the exposure periods set for the respective pixel rows 19d, based on the moving speed SP1 of the illuminated region R1 on the light receiving surface 19c calculated based on the scan speed SP0, the width W1 of the pixel row 19d (FIG. 6) in the scan direction (rolling readout direction) of the light receiving surface 19c, and the number of pixel rows 19d in the exposure region R2 desired to set. Furthermore, the calculation unit 21 sends the length T1 of the exposure periods thus calculated, as an external signal to the external signal receiving section 19e of the imaging device 19. The external signal received is sent to the imaging control section 19b. This allows the imaging control section 19b to variably adjust the length T1 of the exposure periods. For example, the imaging control section 19b changes a driving clock count defining the length of the exposure periods, thereby to change the length T1 of the exposure periods. The calculation unit 21 is configured so as to be able to variably set the number of pixel rows 19d in the exposure region R2 to determine the length T1 of the exposure periods. As the exposure region R2 is set over a plurality of lines in this manner, the sensitivity of imaging of the fluorescence image improves.

Similarly, when the exposure region R2 is set over one line as shown in FIG. 8, the imaging control section 19b sets the length of the exposure periods T1 so as to place no overlap between the exposure periods T1 of adjacent pixel rows 19d, based on the calculation result of the calculation unit 21. When the exposure region R2 is set to a relatively small number of lines, e.g., one line, in this way, the spatial resolution of imaging of the fluorescence image improves.

Furthermore, as shown in FIG. 9, the exposure region R2 is set over one line and the imaging control section 19b sets the length of the exposure periods T1 so as to place no overlap between the exposure periods T1 of adjacent pixel rows 19d, based on the calculation result of the calculation unit 21. At this time, when compared with FIG. 8, the moving speed SP1 of the illuminated region R1 is set lower and, for this reason, the lengths of the exposure periods T1 and the signal readout periods T2 are set relatively longer. As the exposure region R2 is set to the relatively small number of lines in this way, the spatial resolution of imaging of the fluorescence image improves, and the sensitivity improves because the exposure period of each pixel row 19d becomes longer than in the cases of FIG. 7 and FIG. 8. On the other hand, the temporal resolution is superior in the cases of FIG. 7 and FIG. 8 because the scan speed is higher than in FIG. 9.

Furthermore, it is also possible to set the number of pixels to be subjected to signal readout, out of a plurality of pixels forming the pixel row 19d, and to define the set number of pixels as a parameter for calculation of the exposure period T1. In this case, if it is unnecessary to read the whole pixel row 19d, it becomes feasible to read only necessary pixels. In addition, it also becomes feasible to set the signal readout period T2 short and a further degree of freedom can be given to the setting of the interval ΔT1 of the start timing of signal readout.

In the image acquisition system 1 described above, with the illumination light output from the light source 3, the sample S is scanned by the optical scanner 7 and the fluorescence generated from the sample S in response thereto is imaged by the imaging device 19 through the detection optical system. On that occasion, the interval of the start timing of signal readout between adjacent pixel rows 19d of the light receiving surface 19c is calculated based on the moving speed of the illuminated region R1 on the light receiving surface 19c of the imaging device 19 with the scanning with the illumination light, and the start timing of signal readout of each pixel row 19d is controlled based on the calculation result. Since even with change in the scan speed of the illumination light the foregoing control can optimize the signal readout timing in the imaging element in accordance therewith, a degree of freedom is given to the scan speed of the illumination light across the sample S, thus realizing flexible observation of the sample S. When exposure of necessary pixel row is carried out only during the period of application of fluorescence, the spatial resolution can be improved while reducing influence of background noise such as scattered light in the entire image in the light scan range of the sample S.

Here, the imaging device 19 is configured so that the start timing of signal readout is controlled based on the driving clock and so that the interval of the start timing of signal readout is adjusted by providing the delay period in the driving clock. This allows the start timing of signal readout of each pixel row 19d to be set readily and securely, without being limited by an upper limit of a counter for counting the driving clock. It also allows the interval of the start timing of signal readout of each pixel row 19d to be set finely. Furthermore, since the frequency of the driving clock is maintained, there is no need for an optimization process of the rolling readout timing by frequency change.

Since the number of lines in the exposure region R2 on the light receiving surface 19c can be set according to needs by setting the exposure period of each pixel row 19c on the light receiving surface 19c, it is feasible to adequately adjust the spatial resolution, the temporal resolution, and the sensitivity of imaging, depending upon observation and measurement.

In addition, it is also possible to variably set the number of pixels to be subjected to signal readout, out of the plurality of pixels forming each pixel row 19d. This enables adjustment of the signal readout period T2 and makes it feasible to give a further degree of freedom to the setting of the interval ΔT1 of the start timing of signal readout.

It is noted that the present invention is by no means intended to be limited to the aforementioned embodiment. For example, another adjustment method may be adopted as a method for adjusting the interval ΔT1 of the start timing of signal readout by the imaging control section 19b.

Figure 10:
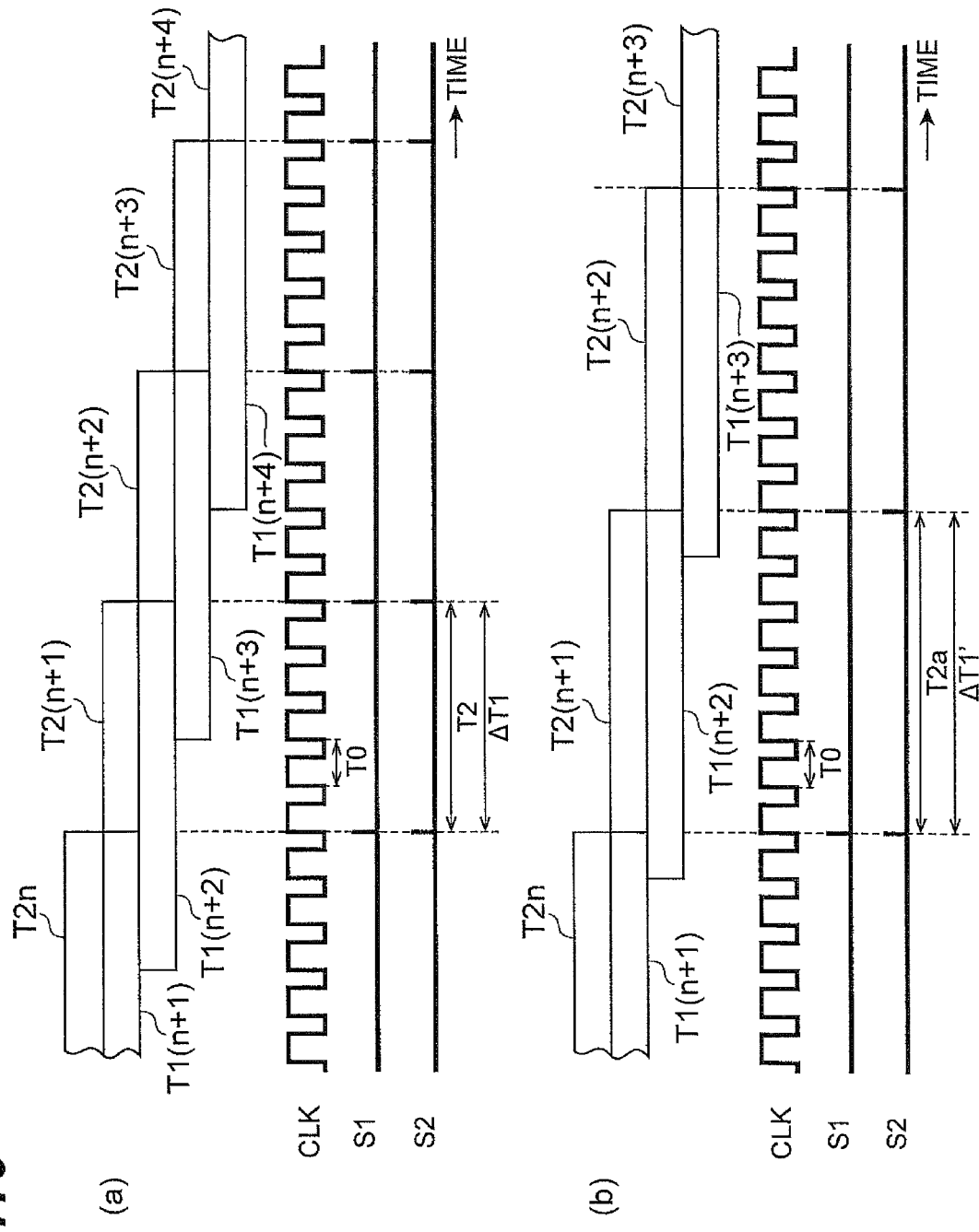
FIG. 10 is timing charts showing a relation between exposure periods and signal readout periods set for the respective pixel rows 19d in the imaging device 19 in a modification example of the present invention.

FIG. 10 is timing charts showing the relation between exposure periods and signal readout periods set for the respective pixel rows 19d in the imaging device 19 in a modification example of the present invention. In the case shown in the same drawing, the imaging control section 19b sets the interval ΔT1 of the start timing of signal readout between adjacent pixel rows 19d, by adjusting the driving clock count defining the signal readout period T2 of each pixel row. Namely, the imaging control section 19b calculates a clock count of the driving clock CLK equivalent to the interval ΔT1' of the start timing of signal readout, based on the interval ΔT1' of the start timing of signal readout calculated by the calculation unit 21 and the frequency 1/T0 of the driving clock CLK, and adjusts the driving clock count as a clock count corresponding to the signal readout period T2a. Therefore, the imaging control section 19b counts the driving clock CLK repeated in the predetermined cycle T0, by a count equivalent to the interval ΔT1' of the start timing of signal readout, from the readout start signal S1 for the preceding pixel row 19d, thereby to generate the readout start signal S1 for the subsequent pixel row adjacent thereto. By this operation, the imaging control section 19b can variably control the start timing of signal readout of each pixel row, depending upon the interval ΔT1 of the start timing of signal readout calculated by the calculation unit 21. In this case, the start timing of signal readout of each pixel row 19d can be set readily and securely. Even if the driving clock is supplied at the timing of completion of signal readout of each pixel row, idle readout will be carried out, without affecting the signal readout processing. Furthermore, since the frequency of the driving clock is maintained, there is no need for the optimization process of the rolling readout timing by frequency change.

Figure 11:
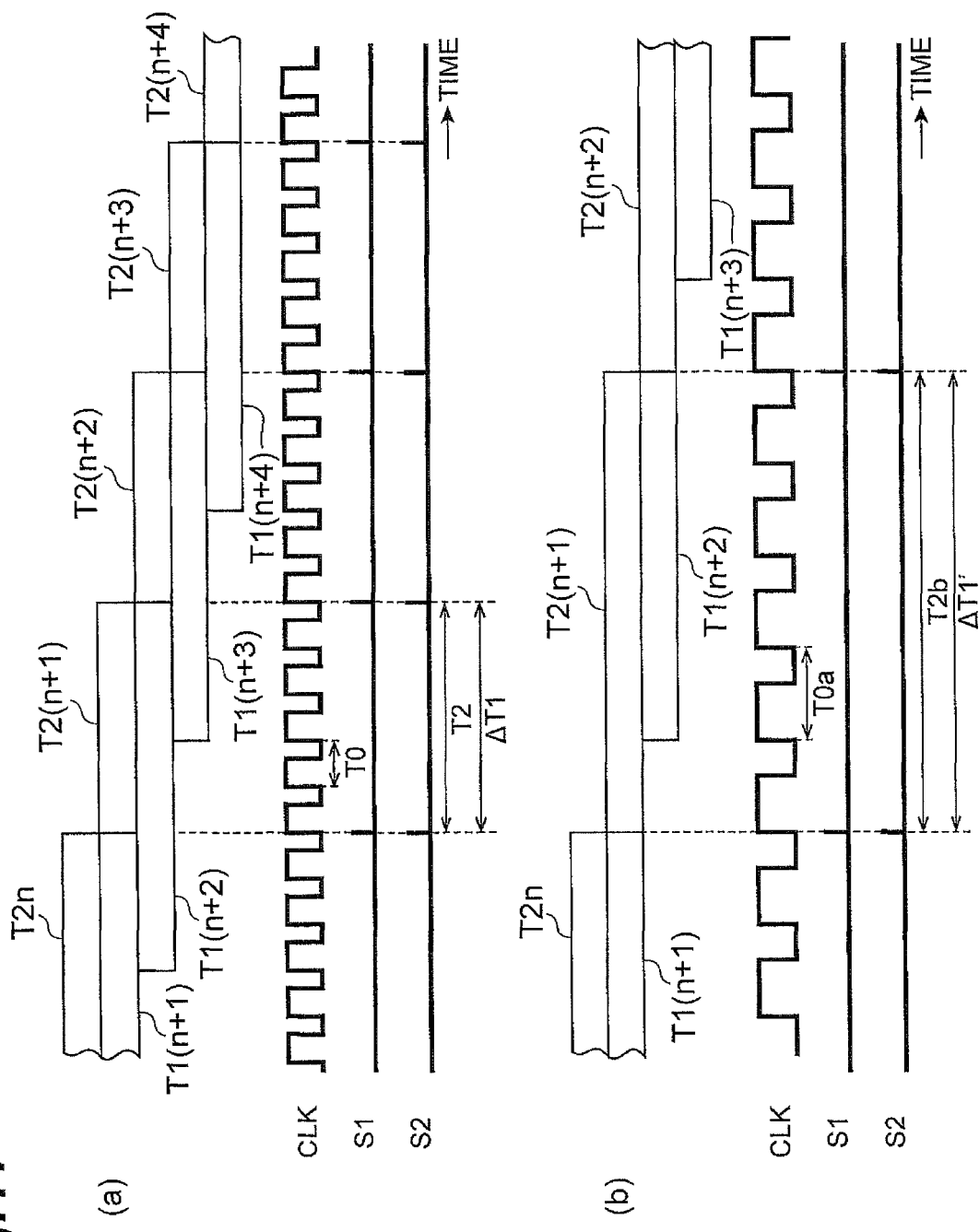
FIG. 11 is timing charts showing a relation between exposure periods and signal readout periods set for the respective pixel rows 19d in the imaging device 19 in another modification example of the present invention.

Furthermore, FIG. 11 is timing charts showing the relation between exposure periods and signal readout periods set for the respective pixel rows 19d in the imaging device 19 in another modification example of the present invention. In the case shown in the same drawing, the imaging control section 19b sets the start timing of signal readout of each pixel row 19d, by adjusting the frequency of the driving clock defining the signal readout period T2 of each pixel row. Namely, the control section calculates the frequency 1/T0a of the driving clock so as to change to the frequency corresponding to the signal readout period T2b, based on the interval ΔT1' of the start timing of signal readout calculated by the calculation unit 21 and the clock count defining the signal readout period T2, and adjusts the frequency of the driving clock CLK to the calculated frequency 1/T0a. Therefore, the imaging control section 19b counts the driving clock CLK repeated in the predetermined cycle T0a, by a count equivalent to the interval ΔT1' of the start timing of signal readout, from the readout start signal S1 for the preceding pixel row 19d, thereby to generate the readout start signal S1 for the subsequent pixel row adjacent thereto. By this operation, the imaging control section 19b can variably control the start timing of the signal readout of each pixel row, depending upon the interval ΔT1 of the start timing of signal readout calculated by the calculation unit 21. In this case, the start timing of signal readout of each pixel row 19d can be set readily and securely, without being limited by the upper limit of the counter for counting the driving clock.

Figure 12:
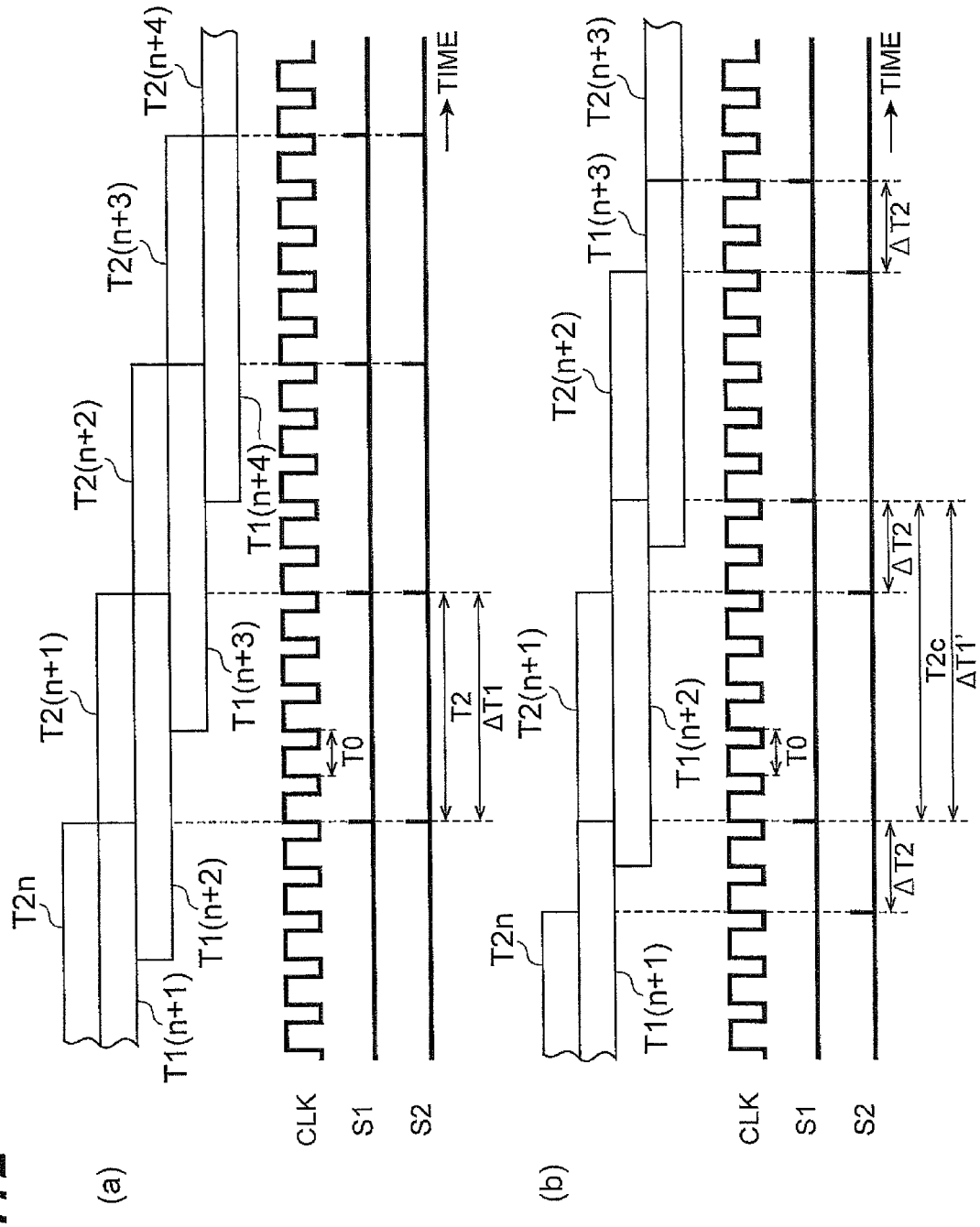
FIG. 12 is timing charts showing a relation between exposure periods and signal readout periods set for the respective pixel rows 19d in the imaging device 19 in another modification example of the present invention.

FIG. 12 is timing charts showing the relation between exposure periods and signal readout periods set for the respective pixel rows 19d in the imaging device 19 in another modification example of the present invention. In the case shown in the same drawing, the imaging control section 19b sets the interval ΔT2 between the end timing of signal readout of the preceding line of pixel row 19d and the start timing of signal readout of the subsequent line of pixel row, by adjusting a driving clock count defining the interval ΔT2. Namely, the control section calculates the interval ΔT2, based on the interval ΔT1' of the start timing of signal readout calculated by the calculation unit 21, the signal readout period T2, and the frequency 1/T0 of the driving clock CLK. Describing it in more detail, the imaging control section 19b first counts the driving clock CLK repeated in the predetermined cycle T0, by a count equivalent to the signal readout period T2, from the readout start signal S1 for the preceding pixel row 19d, thereby to generate the readout end signal S2. Then the control section counts the number of the clock equivalent to the interval ΔT2 from the readout end signal S2, to generate the readout start signal S1 for the subsequent pixel row 19d adjacent thereto. Namely, since the imaging control section 19b counts the clock count equivalent to the period T2c resulting from addition of the interval ΔT2 to the signal readout period T2, the start timing of signal readout of each pixel row can be variably controlled depending upon the interval ΔT1 of the start timing of signal readout calculated by the calculation unit 21. In this case, since the frequency of the driving clock is maintained, there is no need for the optimization process of the rolling readout timing by frequency change.

The methods of setting the interval of the start timing of signal readout, which are shown in FIG. 5 and FIGS. 10 to 12, may be configured in optional combination thereof. Furthermore, any method may be selected depending upon the interval ΔT1' of the start timing of signal readout, out of the setting methods shown in FIG. 5 and FIGS. 10 to 12.

The imaging control section 19b may have an image sensor built therein. In the foregoing embodiment, the interval of the start timing of signal readout was calculated (or set) as an interval of the signal readout and the imaging control section 19b controlled the start timing of signal readout of each pixel row; however, without having to be limited to this, it is also possible, for example, to calculate (or set) an interval of the end timing of signal readout and control the end timing of signal readout of each pixel row.

It is noted herein that in the foregoing image acquisition system the imaging device is preferably configured so that the signal readout is controlled based on the driving clock and so that the imaging control section adjusts the driving clock, based on the interval of signal readout calculated. By adopting this configuration, it is feasible to readily and securely set the interval of signal readout of each pixel row in the imaging device.

The imaging control section is also preferably configured to adjust the driving clock by providing the delay period. In this case, the interval of signal readout of each pixel row in the imaging device can be set finely.

Furthermore, the imaging control section is also preferably configured to set the delay period prior to the signal readout. This makes it feasible to readily set the difference of signal readout between pixel rows.

Yet furthermore, the imaging control section is also preferably configured to adjust the driving clock by changing the frequency of the driving clock. This makes it feasible to easily set the interval of signal readout of each pixel row.

The imaging device is preferably configured so that the signal readout is controlled based on the driving clock and so that the imaging control section adjusts the count of the driving clock defining the signal readout, based on the calculated interval of signal readout and the frequency of the driving clock. By adopting this configuration, the interval of signal readout of each pixel row in the imaging device can be set readily and securely.

Furthermore, the imaging control section is also preferably configured to adjust the count of the driving clock defining the interval of signal readout. This makes it feasible to readily set the difference of signal readout between pixel rows.

Still furthermore, the imaging control section is also preferably configured to adjust the count of the driving clock defining the period of signal readout. This makes it feasible to readily set the difference of signal readout between pixel rows.

The calculation unit is preferably configured to set the exposure period by the light receiving section, based on the moving speed of the illuminated region, the width of the pixel row, and the number of pixel rows corresponding to the illuminated region. By adopting this configuration, the number of pixel rows which can be simultaneously exposed can be set according to needs, and thus it is feasible to adequately adjust the spatial resolution and the temporal resolution.

Furthermore, it is also preferable to variably set the number of pixel rows corresponding to the illuminated region. In this case, the spatial resolution can be freely adjusted.

Moreover, the imaging control section is also preferably configured to variably set the number of pixels to be subjected to signal readout, out of a plurality of pixels forming each of the pixel rows. In this case, it is easy to adjust the signal readout period and it becomes feasible to provide a further degree of freedom to the setting of the interval of signal readout.

It is noted herein that in the foregoing imaging apparatus the interval of signal readout between adjacent pixel rows is preferably set based on the moving speed of the illuminated region on the light receiving section. This makes it feasible to reduce the influence of background noise such as scattered light in the entire image in the light scan range of the object and to improve the spatial resolution.

The imaging control section is preferably configured to adjust the driving clock, based on the interval of signal readout calculated based on the moving speed of the illuminated region on the light receiving section. By adopting this configuration, it is feasible to readily and securely set the interval of signal readout of each pixel row in the imaging device.

The imaging control section is also preferably configured to adjust the driving clock by providing the delay period. In this case, it is feasible to finely set the interval of signal readout of each pixel row in the imaging device.

Furthermore, the imaging control section is also preferably configured to set the delay period prior to the signal readout. This makes it feasible to readily set the difference of the signal readout between pixel rows.

Yet furthermore, the imaging control section is also preferably configured to adjust the driving clock by changing the frequency of the driving clock. This makes it feasible to readily set the interval of signal readout of each pixel row.

The imaging control section is preferably configured to adjust the count of the driving clock defining the signal readout, based on the interval of signal readout calculated based on the moving speed of the illuminated region on the light receiving section and the frequency of the driving clock. By adopting this configuration, it is feasible to readily and securely set the interval of signal readout of each pixel row in the imaging device.

Furthermore, the imaging control section is also preferably configured to adjust the count of the driving clock defining the interval of signal readout. This makes it feasible to readily set the difference of the signal readout between pixel rows.

Still furthermore, the imaging control section is also preferably configured to adjust the count of the driving clock defining the period of signal readout. This makes it feasible to readily set the difference of the signal readout between pixel rows.

It is also preferable to set the exposure period by the light receiving section, based on the moving speed of the illuminated region, the width of the pixel row, and the number of pixel rows corresponding to the illuminated region. By adopting this configuration, the number of pixel rows which can be simultaneously exposed can be set according to needs, and thus it is feasible to adequately adjust the spatial resolution and the temporal resolution.

Yet furthermore, it is also preferable to variably set the number of pixel rows corresponding to the illuminated region. In this case, it is feasible to freely adjust the spatial resolution.

Still furthermore, the imaging apparatus is also preferably configured to further include the external signal receiving section configured to receive the external signal and is configured so that the interval of the signal readout between adjacent pixel rows is set based on the external signal. By adopting this configuration, it is feasible to readily set the interval of signal readout of each pixel row in the image signal of the observation object and to realize the flexible observation of the object.

The imaging control section is also preferably configured to variably set the number of pixels to be subjected to signal readout, out of a plurality of pixels forming each of the pixel rows. In this case, it is easy to adjust the signal readout period and it becomes feasible to give a further degree of freedom to the setting of the interval of signal readout.

INDUSTRIAL APPLICABILITY

The present invention is applicable to use as the image acquisition system and the imaging apparatus for acquiring the image of the observation object and has enabled the flexible observation with the higher degree of freedom given to the scan speed of the illumination light across the observation object.

REFERENCE SIGNS LIST 1 image acquisition system; 3 light source; 7 optical scanner (light scanning unit); 9 optical scanner control unit (light scan control unit); 15 objective lens (detection optical system); 17 relay optical system (detection optical system); 19 imaging device; 19b imaging control section; 19c light receiving surface (light receiving section); 19d pixel row; 19e external signal receiving section; 21 calculation unit; S sample (object).

The invention claimed is:

1. A method comprising:
   setting a scan speed of an optical scanner to scan an object with illumination light;
   setting a rolling readout speed of a CMOS camera including a plurality of pixel rows and for performing signal readout by rolling readout of each of the plurality of pixel rows to acquire an image of an object illuminated by the scanned illumination light so that the scan speed and the rolling readout speed are synchronized;
   generating an external signal by calculating based on the rolling readout speed on a computer, wherein the external signal comprises data indicative of an interval of start timing of signal readout between adjacent pixel rows;
   scanning the object with illumination light on the scan speed by the optical scanner;
   focusing florescence generated by irradiating the object with the illumination light;
   controlling start timing of signal readout of each pixel row of the CMOS camera is controlled based on the external signal;
   capturing the florescence image by the controlled CMOS camera.

2. The method according to claim 1,
   wherein the setting the rolling readout speed of the CMOS camera is performed after the setting the scan speed of the optical scanner.

3. The method according to claim 1, further comprising:
   setting the number of pixel rows that is simultaneously exposed.

4. The method according to claim 3,
   wherein the generating the external signal calculates based on the rolling readout speed and the number of pixel rows on the computer, wherein the external signal comprises data further indicative of a length of exposure periods for the respective pixel rows.

5. The method according to claim 4,
   wherein the setting the number of pixel rows is set to one row, and
   wherein the length of the exposure periods for the respective pixel rows is set so as to place no overlap between the exposure periods of adjacent pixel rows.

6. The method according to claim 1, further comprising:
   setting the number of pixels to be subjected to signal readout,
   wherein the generating the external signal calculates based on the rolling readout speed and the number of pixels on the computer.

7. The method according to claim 1,
wherein the controlling controls the start timing of signal readout of each pixel row so as to start a next signal readout at the same time that signal readout has finished.

8. The method according to claim 1,
wherein the controlling comprises adjusting a count of the driving clock defining the interval of start timing of signal readout between adjacent pixel rows.

9. The method according to claim 1,
wherein the controlling comprises adjusting a variable delay period.

10. The method according to claim 1,
wherein an optical axis of the optical scanner is perpendicular to an optical axis of a lens for the focusing florescence.

11. The method according to claim 1,
wherein the CMOS camera is adjustable to adjust the interval of start timing of signal readout between adjacent pixel rows.

* * * * *